United States Patent
Liu et al.

(10) Patent No.: US 11,893,011 B1
(45) Date of Patent: Feb. 6, 2024

(54) DATA QUERY METHOD AND SYSTEM, HETEROGENEOUS ACCELERATION PLATFORM, AND STORAGE MEDIUM

(71) Applicant: INSPUR SUZHOU INTELLIGENT TECHNOLOGY CO., LTD., Jiangsu (CN)

(72) Inventors: Ke Liu, Jiangsu (CN); Chuang Zhang, Jiangsu (CN); Jie Sun, Jiangsu (CN); Zhixin Ren, Jiangsu (CN); Zhongxiang Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/279,346

(22) PCT Filed: Apr. 28, 2022

(86) PCT No.: PCT/CN2022/089912
§ 371 (c)(1),
(2) Date: Aug. 29, 2023

(87) PCT Pub. No.: WO2023/060878
PCT Pub. Date: Apr. 20, 2023

(30) Foreign Application Priority Data

Oct. 13, 2021 (CN) .......................... 202111190053.0

(51) Int. Cl.
*G06F 16/24* (2019.01)
*G06F 16/242* (2019.01)
(Continued)

(52) U.S. Cl.
CPC ........ *G06F 16/2445* (2019.01); *G06F 16/248* (2019.01); *G06F 16/2455* (2019.01); *G06F 16/24532* (2019.01); *G06F 16/24542* (2019.01)

(58) Field of Classification Search
CPC ........... G06F 16/2445; G06F 16/24542; G06F 16/2455; G06F 16/24532; G06F 16/248
(Continued)

(56) References Cited

U.S. PATENT DOCUMENTS 5,559,939 A * 9/1996 Wada ..................... G06F 40/111
715/267
6,493,701 B2 * 12/2002 Ponnekanti ....... G06F 16/24544
707/999.005
(Continued)

FOREIGN PATENT DOCUMENTS

CN 103678621 A 3/2014
CN 108804554 A 11/2018
(Continued)

OTHER PUBLICATIONS

Li, Ren-gang, et al. "Design and implementation of heterogeneous architecture for database query acceleration." Computer Engineering and Science 42.12: 2169 (2020).
(Continued)

*Primary Examiner* — Hanh B Thai
(74) *Attorney, Agent, or Firm* — IPro, PLLC

(57) ABSTRACT

Provided is a data query method, applied to a heterogeneous acceleration platform. The data query method includes: determining operators in a database management system, and accomplishing, in a parallel processor, functions corresponding to the operators (S101); if an SQL query statement is received, converting, by using a CPU, the where clause in the SQL query statement into a data structure including a binary tree and a linked list (S102); controlling the CPU to generate an operation code stream of the data structure according to node information (S103); and performing, by using the parallel processor, a screening operation corresponding to the operation code stream on records in the
(Continued)

database management system to obtain a query result conforming to the where clause (S104).

20 Claims, 9 Drawing Sheets

(51) Int. Cl.
    *G06F 16/2453*     (2019.01)
    *G06F 16/248*     (2019.01)
    *G06F 16/2455*     (2019.01)

(58) Field of Classification Search
    USPC ......................................................... 707/718
    See application file for complete search history.

(56) References Cited

U.S. PATENT DOCUMENTS

| | | | |
|---|---|---|---|
| 6,763,352 B2* | 7/2004 | Cochrane | G06F 16/24539 |
| 7,039,702 B1* | 5/2006 | Churchyard | H04L 63/1408 |
| | | | 714/39 |
| 10,915,418 B1 | 2/2021 | Dageville et al. | |
| 2002/0120620 A1* | 8/2002 | Chan | G06F 16/2455 |
| 2002/0123984 A1* | 9/2002 | Prakash | G06F 8/34 |
| 2006/0218123 A1* | 9/2006 | Chowdhuri | G06F 16/24532 |
| 2006/0236254 A1* | 10/2006 | Mateescu | G06F 8/75 |
| | | | 715/762 |
| 2007/0290901 A1* | 12/2007 | Hekstra | G11B 20/1426 |
| | | | 341/94 |
| 2011/0200295 A1* | 8/2011 | Ida | H04N 9/8211 |
| | | | 386/230 |
| 2015/0379077 A1* | 12/2015 | Grosse | G06F 16/24542 |
| | | | 707/718 |
| 2016/0224002 A1* | 8/2016 | Weatherhead | G06F 16/00 |
| 2017/0068820 A1 | 3/2017 | Anand et al. | |
| 2018/0018375 A1* | 1/2018 | Brunel | G06F 16/9024 |
| 2018/0357279 A1* | 12/2018 | Park | G06F 16/24542 |
| 2020/0183662 A1* | 6/2020 | Yin | G06F 8/34 |
| 2020/0233661 A1* | 7/2020 | Grosse | G06F 8/45 |
| 2021/0311943 A1* | 10/2021 | Kondiles | G06F 16/24537 |

FOREIGN PATENT DOCUMENTS

| | | |
|---|---|---|
| CN | 110515973 A | 11/2019 |
| CN | 110858202 A | 3/2020 |
| CN | 110990423 A | 4/2020 |
| CN | 111241130 A | 6/2020 |
| CN | 113467905 A | 10/2021 |
| CN | 113641701 A | 11/2021 |

OTHER PUBLICATIONS

Owaida, Muhsen, et al. "Centaur: A framework for hybrid CPU-FPGA databases." 2017 IEEE 25th Annual International Symposium on Field-Programmable Custom Computing Machines (FCCM). IEEE, 2017.

* cited by examiner

| type | ret_type | ret_size | ret_dst | op_func | nargs |
|---|---|---|---|---|---|
| arg1_offset | arg1_len | ● ● ● | | argN_offset | argN_len |

| type | arg_tag | arg_type | arg_size | var_no | arg_data |
|---|---|---|---|---|---|
| arg_data | | | | | |

DATA QUERY METHOD AND SYSTEM, HETEROGENEOUS ACCELERATION PLATFORM, AND STORAGE MEDIUM

CROSS-REFERENCE TO RELATED APPLICATION

The present disclosure claims priority to Chinese patent application No. 202111190053.0, titled "DATA QUERY METHOD AND SYSTEM, HETEROGENEOUS ACCELERATION PLATFORM, AND STORAGE MEDIUM", filed on Oct. 13, 2021 before the China National Intellectual Property Administration, which is incorporated herein in its entirety by reference.

TECHNICAL FIELD

The present disclosure relates to the technical field of heterogeneous acceleration of database software, in particular to a data query method and system, a heterogeneous acceleration platform, and a storage medium.

BACKGROUND

As Moore's Law is slowing down, it is hard to significantly improve the overall performance of a system by simply improving the CPU processes and increasing CPUs in a database server. To further improve the overall performance of the database server, a heterogeneous acceleration platform is usually used in the art to perform database data processing.

SUMMARY

It is an object of the present disclosure to provide a data query method and system, an electronic device, and a storage medium.

To solve the above problem, the present disclosure provides a data query method, applied to a heterogeneous acceleration platform including a CPU and a parallel processor, the data query method including:
  determining operators in a database management system, and accomplishing, in the parallel processor, roles of functions corresponding to the operators;
  in response to a SQL query statement being received, converting, by the CPU, a where clause in the SQL query statement into a data structure comprising a binary tree and a linked list, wherein each node in the data structure corresponds to one operator in the where clause;
  controlling the CPU to generate an operation code stream of the data structure according to node information, wherein the node information comprises a node position and a corresponding function name of each node in the data structure; and
  performing, by the parallel processor, a screening operation corresponding to the operation code stream on records in the database management system to obtain a query result conforming to the where clause.

In some embodiments, the performing, by the parallel processor, a screening operation corresponding to the operation code stream on records in the database management system to obtain a query result conforming to the where clause includes:
  reading a plurality of target records from the database management system;
  executing, by the parallel processor, the screening operation corresponding to the operation code stream by using the target records as an argument source to obtain a Boolean value corresponding to each of the target records;
  setting a target record whose Boolean value is true as the query result conforming to the where clause;
  determining whether all the records in the database management system have been read; and
  in response to not all the records in the database management system having been read, executing an operation of reading the plurality of target records from the database management system.

In some embodiments, the executing, by the parallel processor, the screening operation corresponding to the operation code stream by using the target records as an argument source to obtain a Boolean value corresponding to each of the target records includes:
  reading a current operation code from the operation code stream;
  determining an operation code type of the current operation code;
  in response to the current operation code being an arithmetic operation code, reading a target argument corresponding to the current operation code from the argument source, and performing an arithmetic operation of a function corresponding to the current operation code on the target argument to obtain an operation result, wherein the argument source comprises the target record, a preset constant, and a data stack, and the data stack is configured to store the operation result of the arithmetic operation code and a logical operation code in the operation code stream;
  in response to the current operation code being the logical operation code, reading a Boolean-type operation result from the data stack, and executing a logical operation corresponding to the logical operation code on the Boolean-type operation result to obtain an operation result;
  storing the operation result to the data stack;
  determining whether all the operation codes in the operation code stream have been read;
  in response to all the operation codes in the operation code stream having been read, taking the operation result obtained from a latest logical operation as the Boolean value corresponding to the target record; and
  in response to not all the operation codes in the operation code stream having been read, executing an operation of reading a current operation code from the operation code stream.

In some embodiments, the reading a target argument corresponding to the current operation code from the argument source includes:
  determining a quantity of arguments and an argument offset address according to the current operation code; and
  reading the target argument corresponding to the current operation code from the argument sources based on the quantity of arguments and the argument offset address.

In some embodiments, prior to storing the operation result of the logical operation to the data stack, the method further includes:
  determining whether the operation result of the logical operation is true;

in response to the operation result of the logical operation being true, executing an operation of storing the operation result of the logical operation to the data stack;

in response to the operation result of the logical operation being false, stopping the screening operation on the target record, and determining that the target record does not conform to the where clause.

In some embodiments, the controlling the CPU to generate an operation code stream of the data structure according to the node information includes:

controlling the CPU to determine, based on the node information, argument information about a function corresponding to each node in the data structure, wherein the argument information comprises the argument source, an argument type, and an argument size; and controlling the CPU to generate the operation code corresponding to each node according to the argument information, and gathering all the operation codes to obtain the operation code stream.

In some embodiments, the controlling the CPU to determine, based on the node information, argument information about a function corresponding to each node in the data structure includes:

controlling the CPU to execute a first operation, a second operation, and a third operation according to the node information so as to obtain the argument information about the function corresponding to each node in the data structure, wherein the first operation is determining the argument source of a node according to the node position of the node in the data structure; the second operation is determining a data type of an operation object according to a function name corresponding to the node in the data structure, and determining the argument type of the node according to the data type of the operation object; and the third operation is determining the argument size according to the argument type of the node.

The present disclosure further provides a data query system, applied to a heterogeneous acceleration platform including a CPU and a parallel processor, the data query system includes:

a role accomplishment module, configured to determine operators in a database management system, and accomplish, in the parallel processor, roles of functions corresponding to the operators;

a conversion module, configured to, in response to a SQL query statement being received, convert, by the CPU, a where clause in the SQL query statement into a data structure comprising a binary tree and a linked list, wherein each node in the data structure corresponds to one operator in the where clause;

a code stream generation module, configured to control the CPU to generate, based on node information, an operation code stream of the data structure, wherein the node information comprises a node position and a corresponding function name of each node in the data structure; and a screening module, configured to perform, by the parallel processor, a screening operation corresponding to the operation code stream on records in the database management system to obtain a query result conforming to the where clause.

The present disclosure further provides a storage medium storing computer-executable instructions that, when executed, perform the steps of the data query method described above.

The present disclosure further provides a heterogeneous accelerated platform, including a memory, a CPU, and a parallel processor, wherein a computer program is stored in the memory, and the CPU and the parallel processor implement the steps of the data query method described above.

The present disclosure provides a data query method, applied to a heterogeneous acceleration platform including a CPU and a parallel processor, the data query method including: determining operators in a database management system, and accomplishing, in the parallel processor, roles of functions corresponding to the operators; in response to a SQL query statement being received, converting, by the CPU, a where clause in the SQL query statement into a data structure comprising a binary tree and a linked list, wherein each node in the data structure corresponds to one operator in the where clause; controlling the CPU to generate an operation code stream of the data structure according to node information, wherein the node information comprises a node position and a corresponding function name of each node in the data structure; and performing, by the parallel processor, a screening operation corresponding to the operation code stream on records in the database management system to obtain a query result conforming to the where clause.

BRIEF DESCRIPTION OF THE DRAWINGS

In order to explain embodiments of the present disclosure more clearly, drawings used by the embodiments will be briefly introduced below. Apparently, the drawings in the following description are merely embodiments of the present disclosure, other drawings may be obtained according to the provided drawings by those skilled in the art without involving any creative effort.

DETAILED DESCRIPTION

In order that objects, aspects, and advantages of the embodiments of the present disclosure become more apparent, the technical solutions in the embodiments of the present disclosure will be described clearly and completely below in conjunction with accompanying drawings in the embodiments of the present disclosure. Apparently, the described embodiments are only a part of the embodiments of the present disclosure, not all the embodiments. Based on the embodiments of the present disclosure, all other embodiments obtained by those skilled in the art without involving creative work fall within the protection scope of the present disclosure.

A 'where clause' in a SQL query statement mainly plays the role of filtering and screening, and allows a user to input complex query conditions. The statement may include comparison operations (greater than, less than, and equal to), logical operations (AND, OR, and NOT), arithmetic operations (addition, subtraction, multiplication, and division), priority (bracket), etc. The 'where clause' input by the user will be parsed in terms of morphology and syntax in a database management system, thereby generating a data structure including a binary tree and a linked list, which is called a constraint condition. Each of the records in the database is traversed by executing the constraint condition, i.e., the binary tree and linked list, to determine whether the record satisfies the filtering and screening condition.

In the related art, generally, the heterogeneous acceleration is attempted and practiced only for customized SQL query templates. However, in engineering practice, the SQL queries executed by the database management system are diversified. If the heterogeneous acceleration is available only for customized SQL statements, the range and application value of the heterogeneous acceleration platform will be greatly limited.

Therefore, how to enable the heterogeneous acceleration platform to support any type of where clause query and improve the application scope of the heterogeneous acceleration platform is a technical problem to be solved by those skilled in the art.

Figure 1:
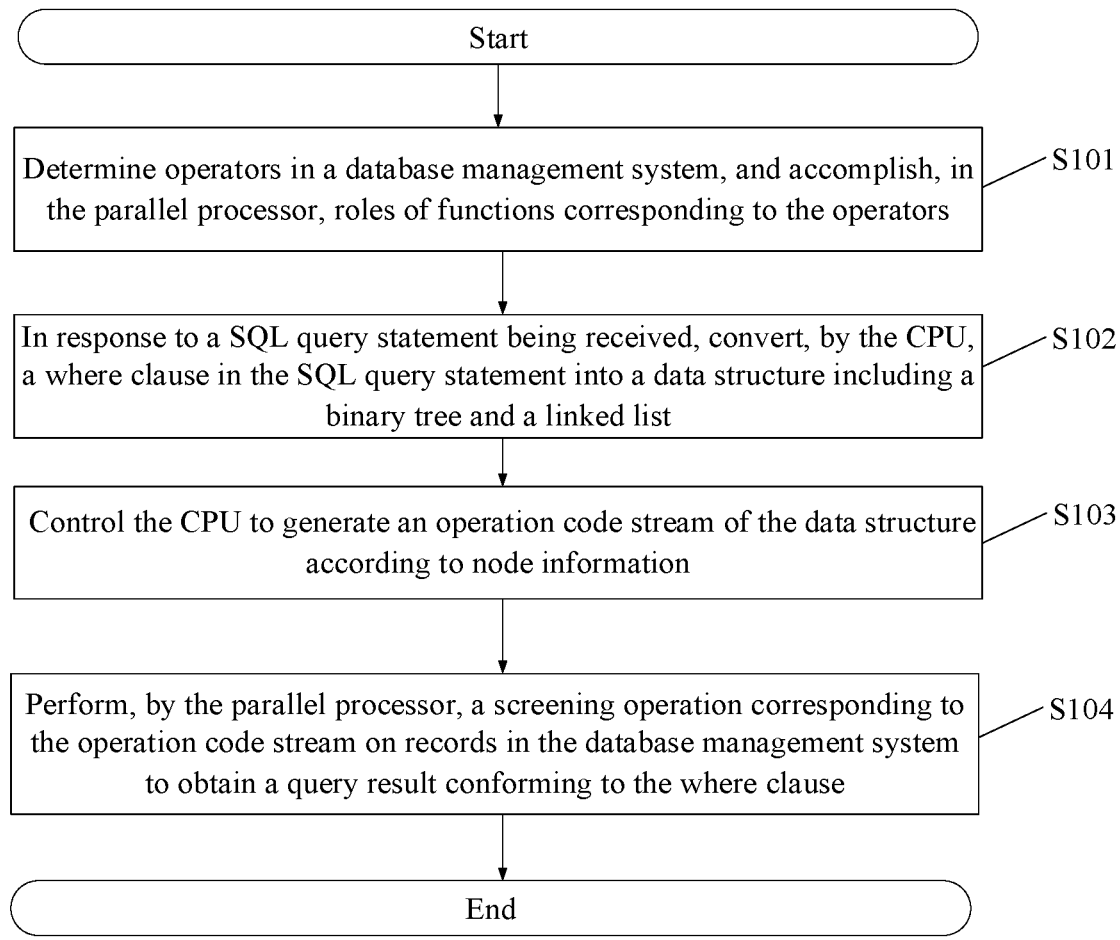
FIG. 1 is a flow chart of a data query method provided by an embodiment of the present disclosure.

Reference is made to FIG. 1 below, which is a flow chart of a data query method provided by an embodiment of the present disclosure. The data query method includes steps described below.

In step S101, operators in a database management system are determined, and roles of functions corresponding to the operators are accomplished in a parallel processor.

This embodiment may be applied to a heterogeneous acceleration platform including a central processing unit (CPU) and a parallel processor. The parallel processor may be a processing chip with parallel processing capabilities, such as a field programmable gate array (FPGA) and a graphics processing unit (GPU).

The database management system in the step may be PostgreSQL (an open-source client/server relational database management system), MySQL, Oracle, etc., and the specific type of the database management system is not limited herein. The present step may determine the operators in the database management system, where each operator corresponds to a function, the function corresponding to each operator in the database management system is a minimum functional unit, and the functional unit corresponding to each operator is constructed in the parallel processor in the step. The functional unit is configured to execute an operation of the function corresponding to the operator. According to the present disclosure, the role of the function corresponding to each operator is accomplished in the parallel processor, so that the parallel processor may realize all the minimum functional units. Multiple record tuples may be stored in the database management system.

In step S102, if a SQL query statement is received, the CPU converts a where clause in the SQL query statement into a data structure including a binary tree and a linked list.

When a user needs to query specific data in the database management system, a SQL query statement including a where clause is generally input to the heterogeneous acceleration platform first. In this step, the CPU is used to convert the where clause in the SQL query statement into a data structure including the binary tree and the linked list.

Figure 2:
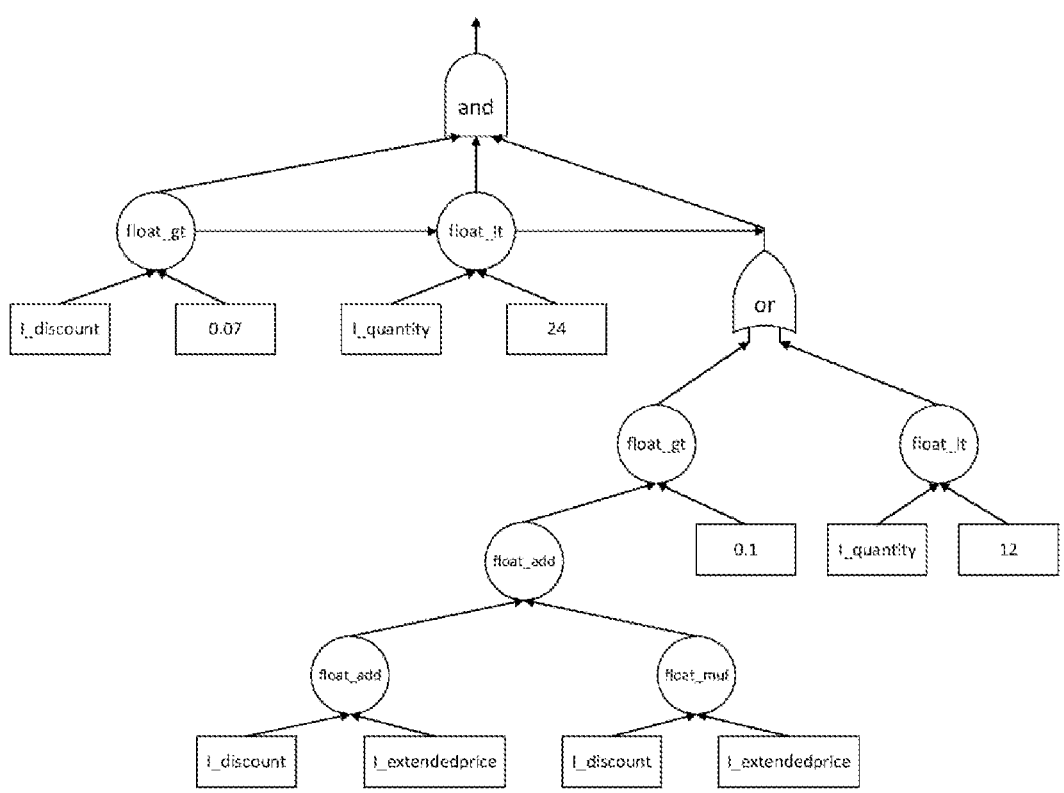
FIG. 2 is a schematic diagram illustrating a data structure including a binary tree and a linked list provided by an embodiment of the present disclosure.

Referring to FIG. 2, FIG. 2 is a schematic diagram illustrating a data structure including the binary tree and the linked list provided by an embodiment of the present disclosure. If the where clause is an expression of I_discount>0.07 and I_quantity<24 and ((I_discount+I_extendedprice)+(I_discount*I_extendedprice)>0.1 or I_quantity>12), including arithmetic operations, size comparison, logical operations, and parenthesis priority, then the data structure converted from the above where clause by the CPU is as shown in FIG. 2. In FIG. 2, float_gt represents a function role of being greater than a floating-point number, float_lt represents a function role of being less than a floating-point number, float_add represents a function role of addition of floating-point numbers, float_mul represents a function role of multiplication of floating-point numbers, "and" represents a logical AND computation, "or" represents a logical OR computation, I_discount represents a discount, I_quantity represents a quantity, and I_extendedprice represents an extended price. Each node in the above data structure corresponds to an operator in the where clause, and taking FIG. 2 as an example, each of float_gt, float_lt, float_add, float_mul, "and", and "or" in FIG. 2 represents a node. In some embodiments, each circular node in FIG. 2 corresponds to an arithmetic operator or comparison operator, for which a corresponding functional unit for forming the function is preset in the FPGA, and a corresponding function role may be called according to a function ID number. The "and" and "or" nodes represent logical operators that are inherently supported by the FPGA.

In step S103, the CPU is controlled to generate an operation code stream of the data structure according to node information.

After converting the where clause into the data structure including the binary tree and the linked list, the CPU may be controlled to generate an operation code stream of the above-mentioned data structure according to node information, and the operation code stream includes an execution order of function roles that may be identified by the parallel processor as well as an argument source, an argument type, and an argument size of each function.

Specifically, the CPU may be controlled to determine argument information about a function corresponding to each node in the data structure according to the node information, where the argument information includes the argument source, the argument type, and the argument size; the CPU is controlled to: generate an operation code corresponding to each node according to the argument information, and gather all the operation codes to obtain the operation code stream.

In some embodiments, the node information includes a node position of each node in the data structure and a function name corresponding to each node. Accordingly, the CPU may be controlled to perform a first operation, a second operation, and a third operation according to the node information so as to obtain the argument information about the function corresponding to each node in the data structure. The first operation is determining the argument source of the node according to the position of the node in the data structure. A data source of a leaf node is data recorded in the database management system or a preset constant, and the data source of a non-leaf node at least includes operation results of other operation codes stored in a data stack. The second operation is determining a data type of an operation object according to the function name corresponding to the node in the data structure, and determining the argument type of the node according to the data type of the operation object. The third operation is determining the argument size according to the argument type of the node.

In step S104, the parallel processor is used to perform a screening operation corresponding to the operation code stream on the records in the database management system, to obtain a query result conforming to the where clause.

In this embodiment, on the basis of the obtained operation code stream, the parallel processor may be used to concurrently perform a screening operation corresponding to the operation code stream on a plurality of records in the database management system, so as to determine a query result conforming to the where clause in the database management system. Since the parallel processor accomplishes the roles of functions corresponding to the operators in the database management system in advance, after receiving the operation code stream, corresponding arithmetic operations and logical operations may be executed according to the function execution order and the argument source of each function in the operation code stream, so as to determine whether each record in the database management system conforms to the requirements of the where clause on the basis of the operation result.

According to this embodiment, roles of functions corresponding to operators in the database management system are accomplished in the parallel processor in advance; upon the reception of a SQL query statement, a where clause in the SQL query statement is converted into a data structure including a binary tree and a linked list, and the data structure is converted into an operation code stream that may be identified by the parallel processor. The operation code stream is generated according to the node position of each node in the data structure and the corresponding function name, and thus the parallel processor may employ the operation code stream to execute a screening operation for the where clause, and obtain a query result conforming to the where clause from the database management system. In this embodiment, function roles are accomplished in the parallel processor with the role of the function as the granularity, so that the parallel processor may complete a screening operation corresponding to any type of where clause by combining the accomplished roles of functions thereof, without being limited to a fixed template. Therefore, the present disclosure enables the heterogeneous acceleration platform to support any type of where clause query, and the application range of the heterogeneous acceleration platform is expanded.

Figure 3:
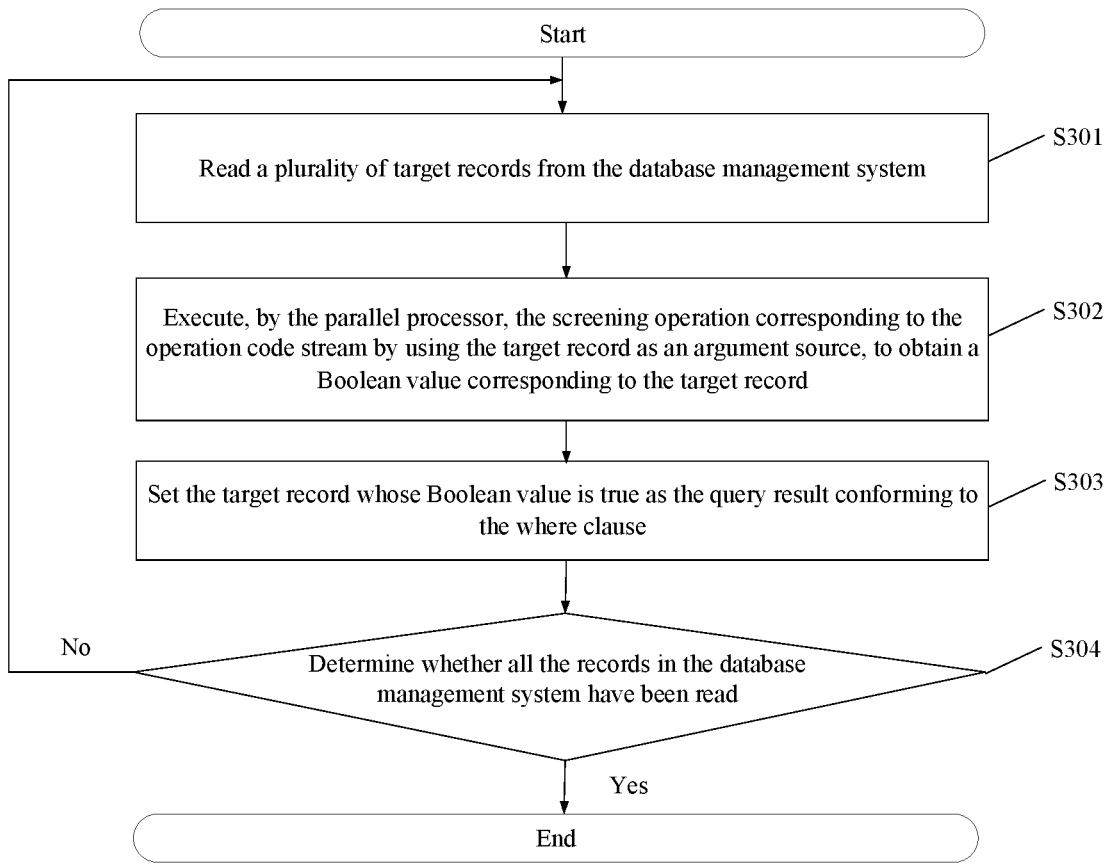
FIG. 3 is a flow chart of a parallel data query conducted by a parallel processor provided by an embodiment of the present disclosure.

Reference is made to FIG. 3, which is a flow chart of a parallel data query conducted by the parallel processor according to an embodiment of the present disclosure, this embodiment is a further description of step S104 in the corresponding embodiment of FIG. 1. A further embodiment may be obtained by combining this embodiment with the corresponding embodiment of FIG. 1, and this embodiment may include steps described below.

In step S301, a plurality of target records are read from the database management system.

In step S302, a screening operation corresponding to the operation code stream is executed by the parallel processor with the target records being used as argument sources, and Boolean values corresponding to the target records are obtained.

In step S303, target records with Boolean values of true are set as the query result conforming to the where clause.

In step S304, it is determined whether all the records in the database management system have been read; if all the records in the database management system have been read, the process is ended; otherwise, the process returns to step S301.

Herein, the maximum number of parallel processes of the parallel processor may be set according to arguments of the parallel processor, and then a corresponding quantity of records are read based on the maximum number of parallel processes and served as target records. After the screening operation corresponding to the operation code stream is executed, a Boolean value corresponding to each target record may be obtained. If the Boolean value is true, then the target record is set as the query result conforming to the where clause. After the screening operation for the target records are completed, a determination may be made as to whether all the records in the database management system have been read, and if the records in the database management system have not been all read, the relevant operations of S301 to S304 may be re-executed.

Figure 4:
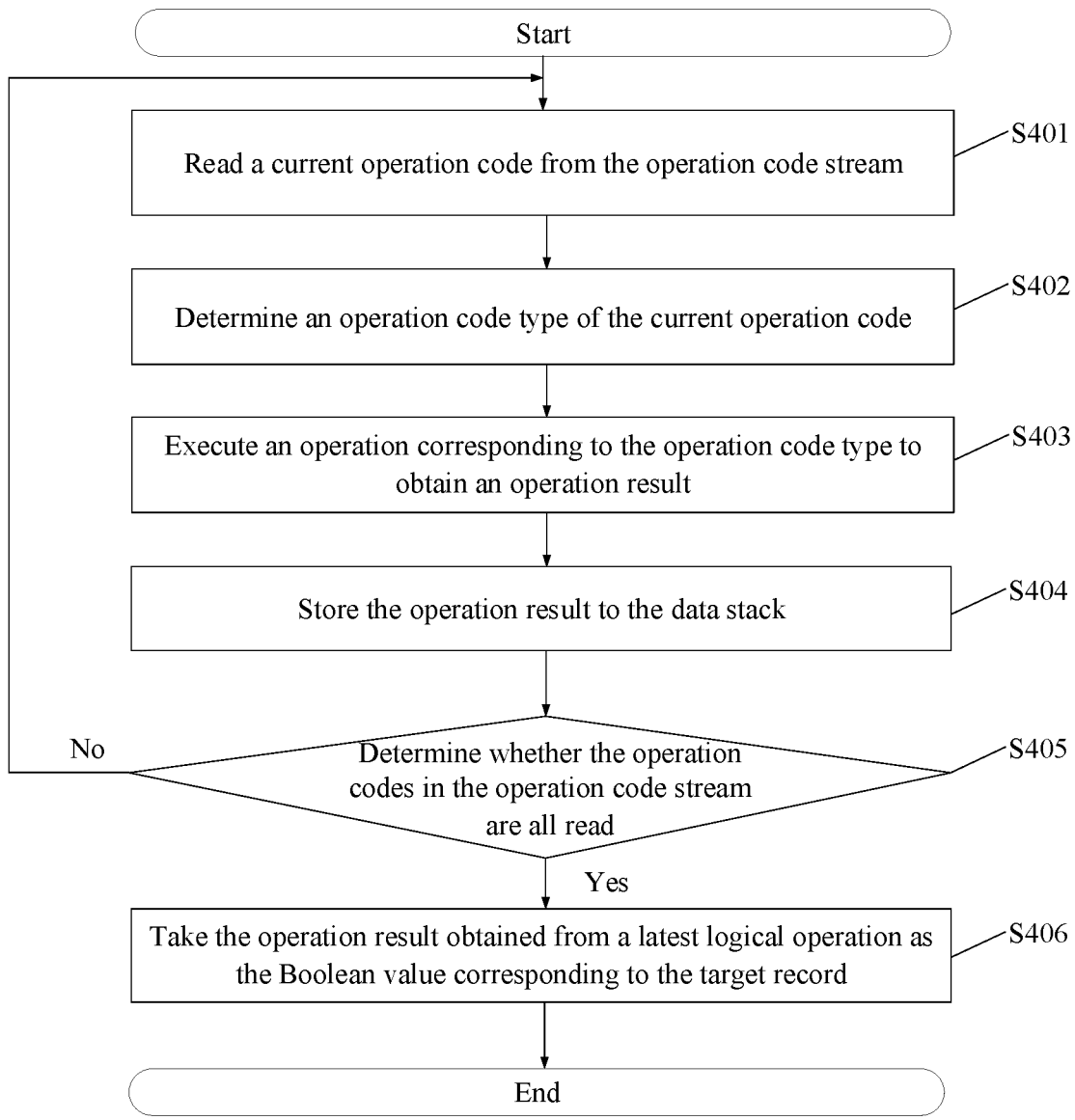
FIG. 4 is a flow chart of a method for performing a screening operation by a parallel processor provided by an embodiment of the present disclosure.

Reference is made to FIG. 4, which is a flow chart of a method for performing the screening operation by the parallel processor provided by an embodiment of the present disclosure. As shown in FIG. 4, the parallel processor may complete the screening operation corresponding to the operation code stream by executing the following steps.

In step S401, a current operation code is read from the operation code stream.

In step S402, an operation code type of the current operation code is determined.

In step S403, a corresponding operation is executed based on the operation code type to obtain an operation result.

In some embodiments, the operation code corresponding to a function includes an arithmetic operation code and a logic operation code.

If the current operation code is the arithmetic operation code, the operation to be executed is as follows: reading the target arguments corresponding to the current operation code from the argument source, and executing an arithmetic operation of the function corresponding to the current operation code on the target arguments to obtain the operation result, where the argument source includes the target record, a preset constant, and a data stack, and the data stack is configured to store the operation result of the arithmetic operation code and the logical operation code in the operation code stream.

If the current operation code is the logical operation code, the operation to be executed is as follows: reading a Boolean-type operation result from the data stack, and executing a logical operation corresponding to the logical operation code on the Boolean-type operation result to obtain the operation result.

In S404, the operation result is stored to the data stack.

In S405, it is determined whether all the operation codes in the operation code stream have been read; if all the operation codes in the operation code stream have been read, then the process proceeds to S406; otherwise, the process returns to S401.

In S406, an operation result obtained from a latest logical operation is taken as the Boolean value corresponding to the target record.

In this embodiment, the target arguments corresponding to the current operation code may be read by: determining a quantity of arguments and an argument offset address based on the current operation code; and reading, based on the quantity of arguments and the argument offset address, the target arguments corresponding to the current operation code from the argument source.

Before the logical operation result is stored in the data stack, a determination may be made as to whether the operation result of the logical operation is true; in response to the operation result of the logical operation being true, an operation of storing the operation result of the logical operation to the data stack is executed; in response to the operation result of the logical operation not being true, the screening operation on the target record is stopped, and the target record is determined as not conforming to the where clause. To illustrate the above process, for example, the where clause is A+B>10 and A×B>10, according to the function execution order of the operation code stream corresponding to the where clause, it is necessary to first calculate whether A+B>10 is true, and then calculate whether A×B>10 is true; if the above-mentioned two results are both true, the screening condition of the where clause is met. If A+B>10 is false, the screening operation may be directly ceased without continuation, and the efficiency of data screening may be improved in this manner.

As a general-purpose processor, the CPU is skilled in management and scheduling. The FPGA may be used to design specialized circuits for high performance parallel computations. The records processed in the database business have no dependency relationships, and are suitable for the parallel processing. A large volume of academic research and simulation experiment data show that the overall performance of the database system may be greatly improved by processing data in the database in a CPU-FPGA heterogeneous environment. In order to further improve the overall performance of a database server, it has become a mainstream trend to use a CPU-FPGA heterogeneous platform to query data. However, a key for converting a CPU-FPGA heterogeneous acceleration of databases to practical applications from the theoretical research is how to flexibly support different SQL statements, and one of the difficulties to be overcome is dealing with the where clause in SQL statements.

In the development of CPU-FPGA heterogeneous acceleration of the existing database software, it is found that there are many limitations concerning application scenarios and development modes, and it is difficult to match with the database software. During the development process, many usage and application scenario limitations below are found: in the related art, (1) a constraint condition format can only be hard-coded into an IP core, that is, only a SQL statement of a fixed template may be processed, and an arbitrary SQL statement input may not be dynamically identified; (2) only comparison and logical operations may be processed, while addition, subtraction, multiplication, division and complex operations with parentheses may not be processed; (3) the data type of the constraint condition is fixed, which may only be int and the count of data is limited.

In order to solve the above defects in the related art, the present disclosure provides a solution of processing Postgresql where clauses based on CPU-FPGA heterogeneity, which further develops and expands CPU-FPGA heterogeneous acceleration on the basis of Postgresql database software. An implementation solution for parsing where clauses in SQL statements in the FPGA is proposed, which extends the application scenario and range where the FPGA can process SQL statements. The specific implementation of this embodiment is described below.

In step A, roles of functions corresponding to each of the operators in Postgresql are accomplished in the FPGA.

Herein, the arithmetic and comparison operation of each data type have a corresponding function ID in Postgresql, and this embodiment may realize roles corresponding to all the function IDs in advance in the FPGA.

Referring to Table 1, which shows information about functions of a floating-point data type, and there is a correspondence between function IDs shown in Table 1 in Postgresql, and this embodiment may accomplish the function roles corresponding to function IDs below in the FPGA in advance.

TABLE 1

Information about functions of floating-point number data type

| Function name | Function ID | Roles | Corresponding operator |
|---|---|---|---|
| float8eq | 293 | Floating-point numbers are equal | = |
| float8ne | 294 | Floating-point numbers are unequal | != |
| float8lt | 295 | The floating-point number is less than . . . | < |
| float8le | 296 | The floating-point number is less than or equal to . . . | <= |
| float8gt | 297 | The floating-point number is greater than . . . | > |
| float8ge | 298 | The floating-point number is greater than or equal to . . . | >= |
| float8mul | 216 | Multiplication of floating-point numbers | * |
| float8div | 217 | Division of floating-point numbers | / |
| float8pl | 218 | Addition of floating-point numbers | + |
| float8mi | 219 | Subtraction of floating-point numbers | − |

In Step B, a where clause is converted into a data structure including a binary tree and a linked list in the CPU, and an operation code stream is generated.

In this step, a result of parsing, by Postgresql, the SQL statements input by the user is traversed. In the process of traversing, the source, type, and size of the arguments are derived based on the position where each node is located and the function ID information, and the information about each node is formed into an operation code. According to the function ID of the function executed, the operation codes are classified into arithmetic operation codes and logical operation codes, thus the original result of parsing, by Postgresql, the SQL statement is finally converted into the operation code stream that may be processed by the FPGA.

For the SQL statement input by the user, Postgresql performs lexical and grammatical parsing, processes operators, constant expressions and parentheses priorities in the statement, and converts the where clause into a data structure including a binary tree and a linked list. Each node on the binary tree plus linked list corresponds to an operator input by the user. Each node is traversed by the CPU in execution, the corresponding operator function is executed, and finally, a Boolean value indicating whether the current record conforms to the screening condition of the where clause is obtained.

Figure 5:
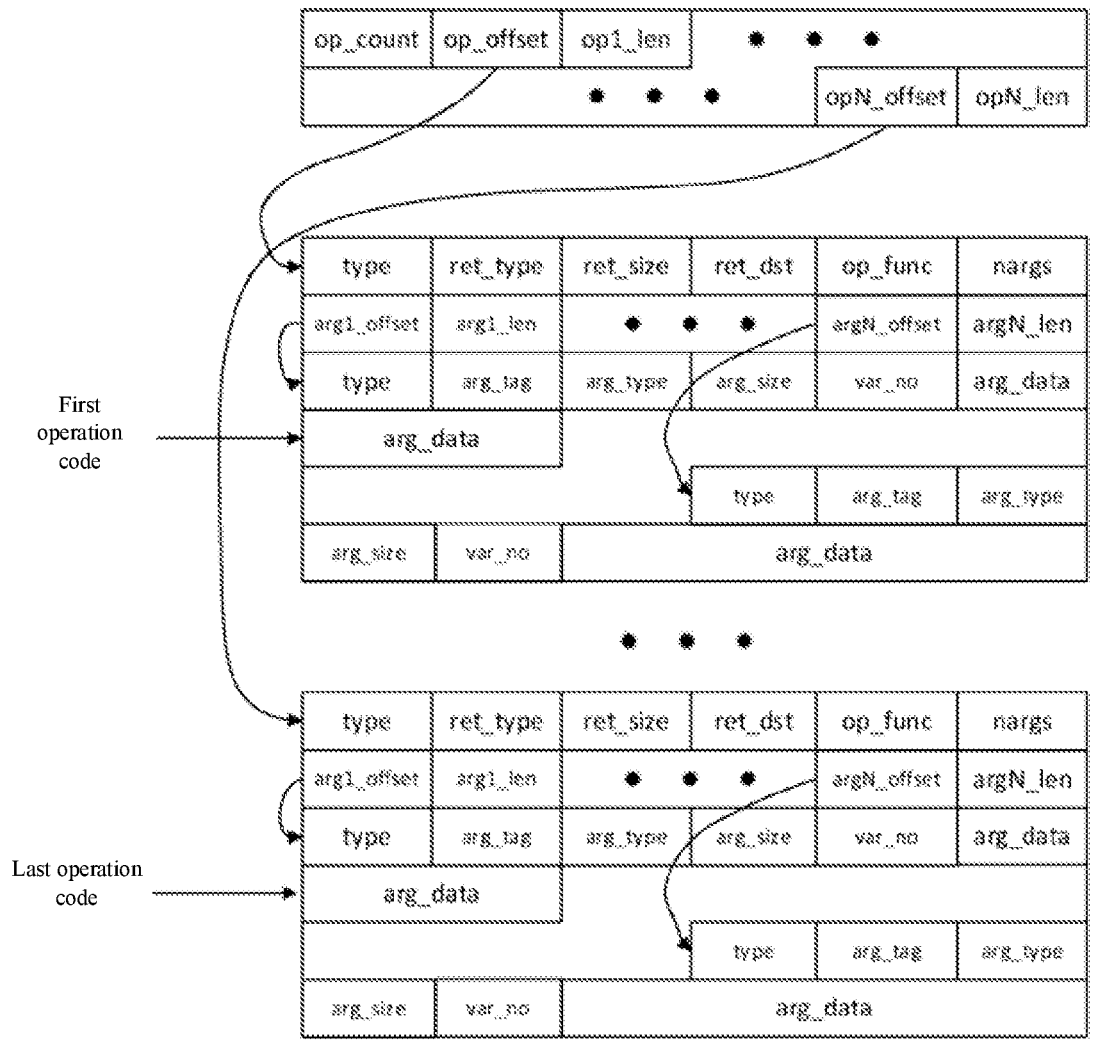
FIG. 5 is a schematic diagram illustrating an overall structure of an operation code stream provided by an embodiment of the present disclosure.

Before starting query scanning, the CPU traverses the function IDs of the nodes recorded by the binary tree plus linked list generated by Postgresql; based on the position of the node and the function ID information, the source, type, and size of function arguments are derived to form an operation code data structure; finally, the operation codes of all the nodes are gathered to form an operation code stream with a fixed format. With reference to FIG. 5, FIG. 5 is a schematic diagram illustrating an overall structure of the operation code stream provided by an embodiment of the present disclosure.

Figures 6, 7, 8:
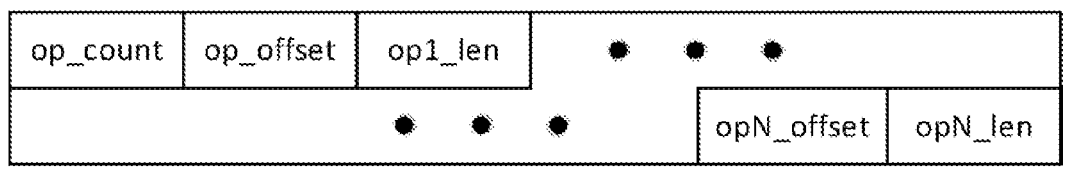
FIG. 6 is a schematic diagram illustrating a structure of a code stream header provided by an embodiment of the present disclosure.
FIG. 7 is a schematic diagram illustrating a code stream structure of an operation code header provided by an embodiment of the present disclosure.
FIG. 8 is a schematic diagram illustrating a code stream structure of argument information provided by an embodiment of the present disclosure.

Referring to FIG. 6, FIG. 6 is a schematic diagram illustrating a structure of a header of the code stream provided by an embodiment of the present disclosure. The header of the code stream identifies the quantity of operation codes and an offset and size of each operation code in the code stream in a fixed format. In FIG. 6, op_count indicates how many operation codes in total, op offset indicates the offset of an operation code 1 in the code stream, op1_len indicates a length of the operation code 1, opN_offset indicates the offset of the last operation code N in the code stream, and opN_len indicates the length of the last operation code N.

With reference to FIG. 7, FIG. 7 is a schematic diagram illustrating a code stream structure of an operation code header provided by an embodiment of the present disclosure, the operation code header identifies relevant information about an operation code, including the type of the operation code, an ID number of an operation function used by the operation code, the quantity of arguments, and the offset and size of the arguments in the operation code. In this embodiment, the operation codes are classified into two types according to the ID of the operation function, namely, arithmetic operation codes (e.g., addition, subtraction, multiplication, division, comparison, etc.), and logical operation codes (such as "and", "or", "not", etc.). In FIG. 7, "type" represents the type of operation code (arithmetic operation code or logical operation code), op_func represents the function ID number of the operation code, nargs represents the quantity of arguments of the operation code, arg1_offset represents the offset of the first argument from a starting position of the operation code, arg1_len represents the length of the first argument, argN_offset represents the offset of the last argument from the starting position of the operation code, and argN_len represents the length of the last argument.

With reference to FIG. 8, FIG. 8 is a schematic diagram illustrating a code stream structure of argument information provided by an embodiment of the present disclosure. The argument information in the operation code identifies the argument type, the argument size, and the argument source. In some embodiments, when the CPU traverses the data structure including the binary tree and the linked list, the argument information of the function is derived based on the position of the node and the type of the called function. An argument tag (arg_tag) indicates the source of the current argument, including: (1) sourcing from a certain column in the current tuple, in this case arg_tag=104, and a var_no field is used to indicate a number of the column used in the tuple; (2) sourcing from a constant, in this case arg_tag=105, and an arg_data field is used to store the value of the constant; (3) sourcing from a stack, in this case arg_tag is the default. In some embodiments, the data type of the operation object may be derived from the function ID, and the argument size may be derived from the argument type since the argument type is known. In FIG. 8, arg_tag represents an argument tag, arg type represents the argument type, arg size represents the argument size, var_no represents a column number in the tuple when arg_tag==104 type, and arg_data represents a fixed value (namely, a preset constant) input by the user when arg_tag==105.

In step C, the FPGA screens the records of Postgresql based on the operation code stream.

In this step, FPGA parses based on operation codes in the operation code stream one by one, arguments are acquired according to the source, type, and size of the arguments, and a function role unit corresponding to the function ID in the operation code is called. The intermediate results are stored in the form of a stack during the operation.

In the development of the heterogeneous acceleration of databases, an acceleration library provided by the FPGA is generally designed to only provide general and basic processing logics. In the development of CPU-FPGA heterogeneous acceleration that is practically applied to a specific database software, it is necessary to plan, adapt, and adjust the overall scheme according to the design architecture and data structure of the database software itself.

In some embodiments, the CPU sends the operation code stream to the FPGA after initiating a query scan. The FPGA parses each operation code in the operation code stream, and for each record in Postgresql (called as tuples in Postgresql), traverses all the function IDs in the operation code stream in turn, and calls corresponding role units that have been implemented in the FPGA. When the above actions have been executed on the last operation code, a Boolean value 'qual' is obtained, which indicates whether the current record satisfies the screening process of the where clause.

Figure 9:
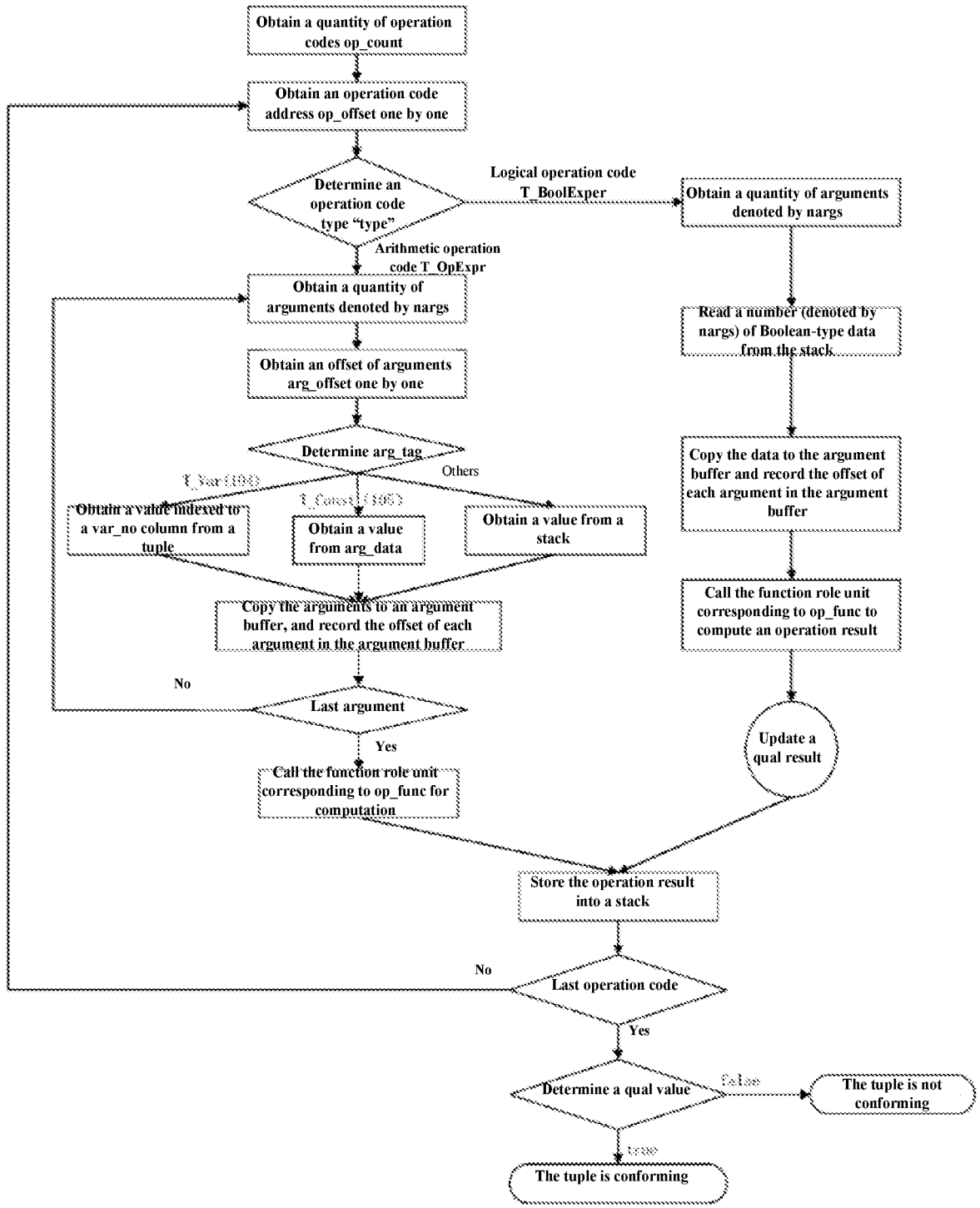
FIG. 9 is a schematic diagram illustrating a workflow of FPGA provided by an embodiment of the present disclosure.

Reference is made to FIG. 9, which is a schematic diagram illustrating a workflow of the FPGA provided by an embodiment of the present disclosure. The workflow includes: acquiring the quantity of operation codes (i.e., op_count) from the operation code stream, and acquiring the address of the operation code (i.e., op offset) one by one to determine the operation code type, i.e., "type".

If the operation code type is the arithmetic operation code T_OpExpr, the quantity of arguments denoted by nargs is acquired, and the offsets of the arguments (arg offset) are acquired one by one; the source of the arguments is determined by identifying the value of the arg_tag field, so as to acquire the value of the arguments from a specified position according to the arg_tag of each argument. If the value of arg_tag is T_Var (104), a value indexed to a var_no column is acquired from the tuple; if the value of arg_tag is T_Const (105), a numerical value (namely, a preset constant) is acquired from arg_data; if the value of arg_tag is a value other than T_Var (104) and T_Const (105), the value is obtained from the stack. The arguments obtained from the argument source are copied to an argument buffer, and the offset of each argument in the argument buffer is recorded. The above operation of acquiring arguments is performed iteratively until the last argument of the operation code is acquired. The function role unit corresponding to op_func is called to perform computation, and the operation result is stacked and stored.

If the operation code type is the logical operation code T_BoolExper (113), the quantity of arguments denoted by nargs is acquired, the same count (nargs) of Boolean-type data (i.e., Boolean-type operation results) is read from the stack, and copied into the argument buffer, the offset of each argument in the argument buffer is also recorded. The function role unit corresponding to op_func is called to compute an operation result, the operation result is stored in a qual variable and the qual result is updated, and the operation result is stacked and stored.

An iterative execution of the operation codes is performed until the last argument of the operation code is obtained. The function unit corresponding to op_func is called to perform computation, and the operation result is stacked and stored. After all the operation codes are processed, a determination is made as to whether the qual value is true to determine whether the current record satisfies the filtering condition. If the qual value is true, the tuple satisfies the condition; if the qual value is false, the tuple does not satisfy the condition.

In the above embodiment, the function corresponding to each operator in Postgresql is taken as the minimal role unit, all the minimal role units are accomplished in advance in the FPGA. By traversing the parsing result of the Postgresql where clause, using the function ID in Postgresql as the index for calling a function in the FPGA, and deriving the relevant information of the arguments of functions, when called, the operation code stream that can be recognized by the FPGA is formed. On the basis of the function ID and argument information provided in the operation code stream, the FPGA realizes the parsing of the where clause. Compared with the related art, the present solution may dynamically support the parsing of where clauses in SQL statements without hard coding a SQL statement template in an IP core; the present solution has no restriction on the quantity of constraints; and the present solution supports common data types in Postgresql, for example, int, float, date, timestamp, etc., and also supports arithmetic operations and expressions including parentheses. The solution with reference to this embodiment may also be applied to other database software such as MySQL and Oracle, for which a similar process may be performed on the SQL statement input by the user. As long as a method for calling the functions and processing the arguments is available, the corresponding data structure may also be converted into an operation code stream that can be processed by the FPGA, and the support for the SQL statement in the heterogeneous acceleration of the database may be extended.

A TPC-H dataset of 1 GB is taken as an example to explain the above-mentioned process. The 15th record and the 17th record in the dataset are selected, and the 5th, 6th and 7th column data of the 15th record and the 17th record are shown in Table 2. As shown in Table 2, the $5^{th}$ column data is the quantity (l_quantity), the $6^{th}$ column data is the extended price (l_extendedprice), and the 7th column data is the discount (l_discount).

TABLE 2

Comparison of Records

| | l_quantity | l_extendedprice | l_discount |
|---|---|---|---|
| 15th record | 21 | 27076.98 | 0.09 |
| 17th record | 41 | 64061.68 | 0.04 |

The FPGA may parse operation codes one by one according to the offset and length of each operation code in the code stream. Arguments are acquired from corresponding positions according to arg_tag in the argument field, and a corresponding operation function is called according to the function ID corresponding to the operation code, and the result is stored into the stack, so as to finally render a determination on whether a record satisfies the filtering condition.

Figure 10:
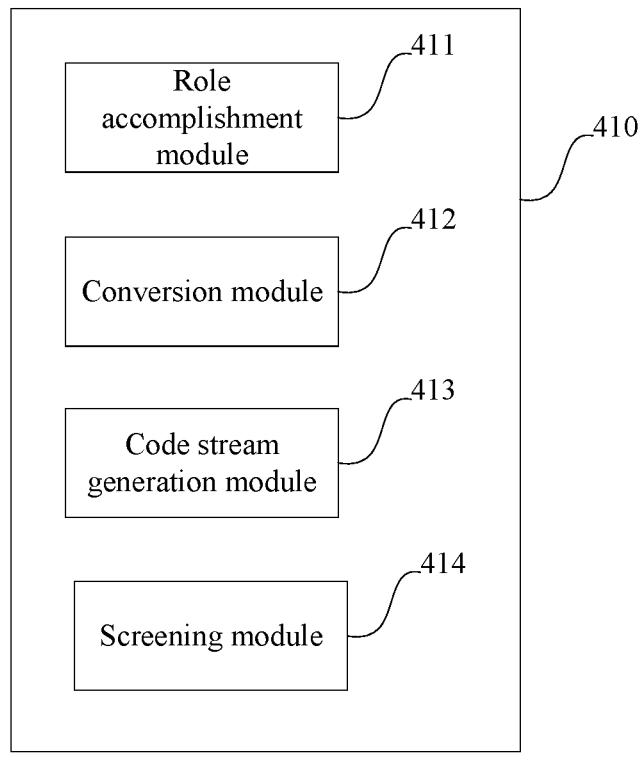
FIG. 10 is a schematic structural diagram of a data query system provided by an embodiment of the present disclosure.

Reference is made to FIG. 10, which is a schematic structural diagram of a data query system provided by an embodiment of the present disclosure. A data query system 410 provided by an embodiment of the present disclosure is applied to a heterogeneous acceleration platform including a CPU and a parallel processor, and the data query system 410 includes:

a role accomplishment module 411 configured to determine operators in a database management system, and cause the parallel processor to realize roles of functions corresponding to the operators;

a conversion module 412 configured to, in response to receiving a SQL query statement, convert, by the CPU, a where clause in the SQL query statement into a data structure including a binary tree and a linked list, wherein each node in the data structure corresponds to one operator in the where clause;

a code stream generation module 413 configured to control the CPU to generate an operation code stream for the data structure according to node information, wherein the node information includes a node position and a corresponding function name of each node in the data structure; and a screening module 414 configured to perform, by the parallel processor, a screening operation corresponding to the operation code stream on records in the database management system to obtain a query result conforming to the where clause.

According to this embodiment, roles of functions corresponding to operators in a database management system are accomplished in a parallel processor in advance; a where clause in a SQL query statement is converted into a data structure including a binary tree and a linked list upon the reception of the SQL query statement, and the above data structure is converted into an operation code stream that can be recognized by the parallel processor. The operation code stream is generated according to the node position of each node in the data structure and the corresponding function name, and therefore the parallel processor may execute a screening operation of the where clause according to the operation code stream, and obtain a query result conforming to the where clause from the database management system. In this embodiment, the function roles are enabled in the parallel processor with the role of the function as the granularity, thus the parallel processor may complete a screening operation corresponding to any type of where clause by combining the enabled roles of functions thereof, without being limited to a fixed template. Therefore, in the present embodiment, the heterogeneous acceleration platform may support any type of where clause query and expand the application range of the heterogeneous acceleration platform.

In some embodiments, the screening module includes:

a record reading unit configured to read a plurality of target records from the database management system;

an operation code execution unit configured to cause the parallel processor to execute the screening operation corresponding to the operation code stream by using the target records as an argument source, and obtain a Boolean value corresponding to each of the target records;

a query result generation unit configured to set a target record whose Boolean value is true as the query result conforming to the where clause;

a determining unit configured to determine whether all the records in the database management system have been read, and execute a working flow of the recording reading unit in response to determining that not all the records in the database management system have been read.

In some embodiments, the operation code execution unit is configured to read a current operation code from the operation code stream; further configured to determine an operation code type of the current operation code; further configured to, in response to the current operation code being an arithmetic operation code, read target arguments corresponding to the current operation code from the argument source, and perform an arithmetic operation of a function corresponding to the current operation code on the target arguments to obtain an operation result, wherein the argument source includes the target records, a preset constant, and a data stack, and the data stack is configured to store the operation result of the arithmetic operation code and a logical operation code in the operation code stream; further configured to, in response to the current operation code being the logical operation code, read a Boolean-type operation result from the data stack, and execute a logical operation corresponding to the logical operation code on the Boolean-type operation result to obtain an operation result; further configured to store the operation result to the data stack; further configured to determine whether all the operation codes in the operation code stream have been read, take the operation result obtained from a latest logical operation as the Boolean value corresponding to the target record if all the operation codes in the operation code stream have been read, and execute an operation of reading the current operation code from the operation code stream if not all the operation codes in the operation code stream have been read.

In some embodiments, a process for the operation code execution unit to read the target arguments corresponding to the current operation code from the argument source includes: determining a quantity of arguments and an argument offset address according to the current operation code; and reading the target arguments corresponding to the current operation code from the argument sources based on the quantity of arguments and the argument offset address.

In some embodiments, the screening module further includes:
  a logical operation result analysis unit configured to, prior to storing the operation result of the logical operation to the data stack, determine whether the operation result of the logical operation is true; execute an operation of storing the operation result of the logical operation to the data stack if the operation result of the logical operation is true, and stop the screening operation for the target record and determine that the target record does not conform to the where clause if the operation result of the logical operation is not true.

In some embodiments, the code stream generation module includes:
  an argument information determination unit configured to control the CPU to determine, according to the node information, argument information about a function corresponding to each node in the data structure, wherein the argument information includes the argument source, an argument type, and an argument size; and
  an operation code gathering unit configured to control the CPU to generate the operation code corresponding to each node according to the argument information, and gather all the operation codes to obtain the operation code stream.

In some embodiments, the operation code gathering unit is configured to control the CPU to execute a first operation, a second operation, and a third operation according to the node information so as to obtain the argument information about the function corresponding to each node in the data structure, wherein
  the first operation is determining the argument source of a node according to the node position of the node in the data structure; the second operation is determining a data type of an operation object according to a function name corresponding to the node in the data structure, and determining the argument type of the node according to the data type of the operation object; and the third operation is determining the argument size according to the argument type of the node.

Since the embodiment of the system and the embodiment of the method correspond to each other, the embodiment of the system may be learned with reference to the description of the embodiment of the method, and will not be repeated here.

Figure 12:
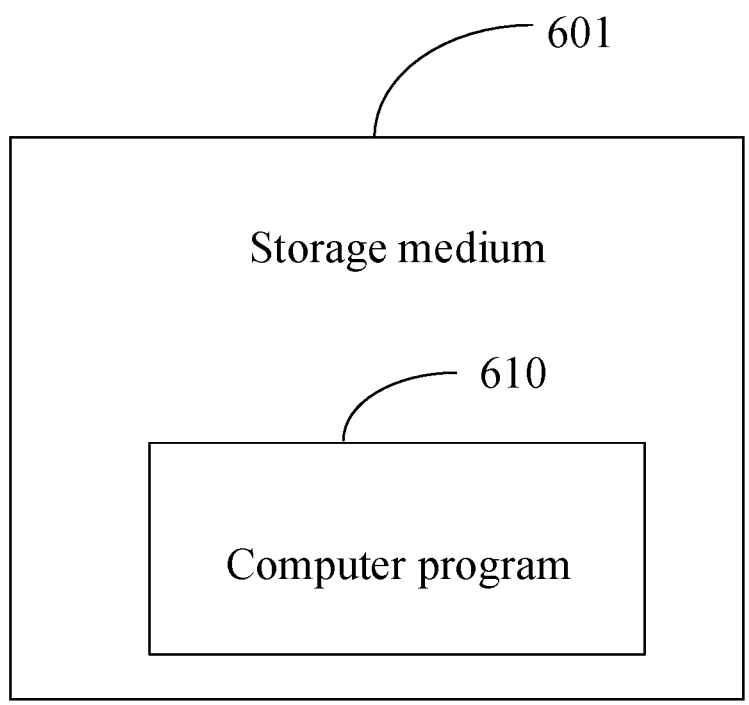
FIG. 12 is a schematic structural diagram of a storage medium provided by an embodiment of the present disclosure.

Reference is made to FIG. 12, which is a schematic structural diagram of a storage medium provided by an embodiment of the present disclosure. The present disclosure further provides a storage medium 601 on which is stored a computer program 610 that, when executed, performs the steps provided by the embodiments described above. The storage medium 601 may include various media that may store program codes, such as a USB drive, removable hard disk, read-only memory (ROM), random access memory (RAM), and magnetic or optical disk.

Figure 11:
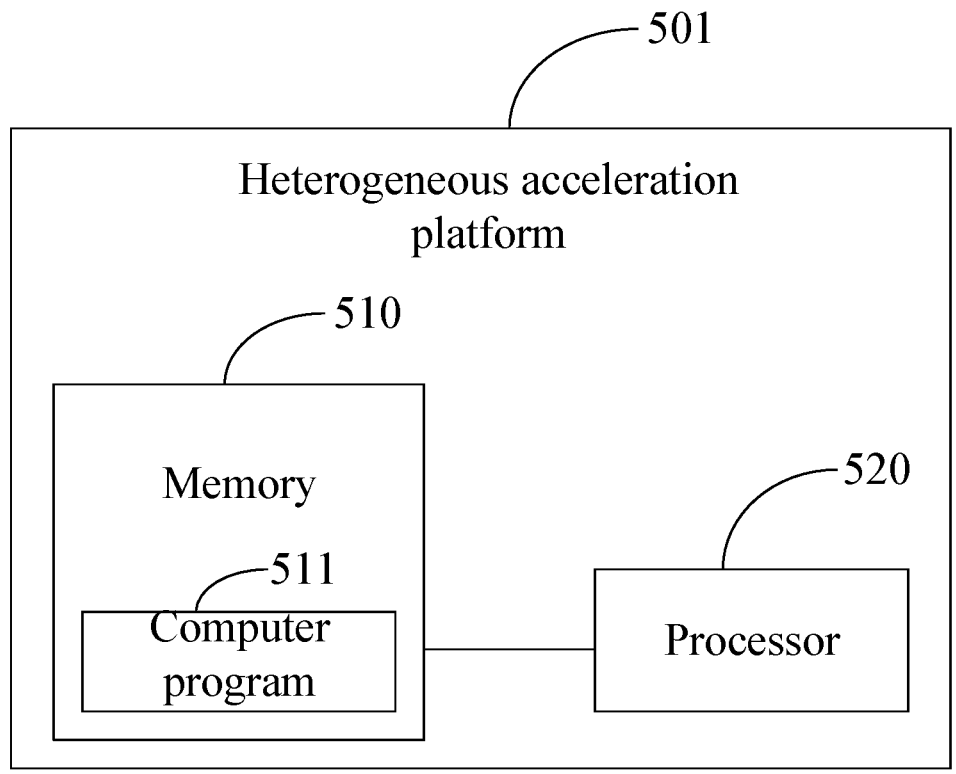
FIG. 11 is a schematic structural diagram of a heterogeneous acceleration platform provided by an embodiment of the present disclosure.

Reference is made to FIG. 11, which is a schematic structural diagram of a heterogeneous acceleration platform provided by an embodiment of the present disclosure. The present disclosure further provides a heterogeneous acceleration platform 501, including a memory 510, an CPU, and a parallel processor 520, wherein the memory 510 stores a computer program 511, and the CPU and the parallel processor 520 realize the steps of the above-mentioned data query method when calling the computer program 511 in the memory 510. Apparently, the heterogeneous acceleration platform 501 may also include various components such as a network interface and power supply.

Various embodiments in the specification are described in a progressive manner, each embodiment focuses on the difference from other embodiments, and the same and similar parts of various embodiments can be referred to each other. Since the system disclosed in the embodiments corresponds to the method disclosed in the embodiments, the description thereof is relatively simple, and for relevant details, please refer to the description of the method. It should be pointed out that those skilled in the art can make some improvements and modifications to the application without departing from the principles of the application, and these improvements and modifications also fall within the protection scope of the claims of the application.

It should also be noted that relational terms such as "first", "second" as used herein are merely used to distinguish an object or operation from another object or operation, and are not necessarily used to describe or imply that such an actual relationship or sequence exists between these objects and operations. Furthermore, the terms "comprising" and "having", as well as any variations thereof, are intended to cover a non-exclusive inclusion, e.g., a process, method or apparatus comprising a series of steps or elements is not necessarily limited to those elements explicitly listed, but may include other elements not explicitly listed or inherent to the process, method or apparatus. Without further limitations, an element defined by the phrase "comprising a . . . " does not exclude the presence of additional identical elements in the process, method, article or apparatus comprising said element.

The invention claimed is:

1. A data query method, applied to a heterogeneous acceleration platform comprising a central processing unit (CPU) and a parallel processor, the data query method comprising:

determining operators in a database management system, and accomplishing, in the parallel processor, roles of functions corresponding to the operators;

in response to a SQL query statement being received, converting, by the CPU, a where clause in the SQL query statement into a data structure comprising a binary tree and a linked list, wherein each node in the data structure corresponds to one operator in the where clause;

controlling the CPU to generate an operation code stream of the data structure according to node information, wherein the node information comprises a node position and a corresponding function name of each node in the data structure; and performing, by the parallel processor, a screening operation corresponding to the operation code stream on records in the database management system to obtain a query result conforming to the where clause.

2. The data query method according to claim 1, wherein the performing, by the parallel processor, a screening operation corresponding to the operation code stream on records in the database management system to obtain a query result conforming to the where clause comprises:

reading a plurality of target records from the database management system;

performing, by the parallel processor, the screening operation corresponding to the operation code stream by using each of the target records as an argument source to obtain a Boolean value corresponding to each of the target records;

setting a target record whose Boolean value is true as the query result conforming to the where clause;

determining whether all the records in the database management system have been read; and in response to not all the records in the database management system having been read, executing an operation of reading the plurality of target records from the database management system.

3. The data query method according to claim 2, wherein the performing, by the parallel processor, the screening operation corresponding to the operation code stream by using each of the target records as an argument source to obtain a Boolean value corresponding to each of the target records comprises:

reading a current operation code from the operation code stream;

determining an operation code type of the current operation code;

in response to the current operation code being an arithmetic operation code, reading target arguments corresponding to the current operation code from the argument source, and performing an arithmetic operation of a function corresponding to the current operation code on the target arguments to obtain an operation result, wherein the argument source comprises the target record, a preset constant, and a data stack, and the data stack is configured to store the operation result of the arithmetic operation code and a logical operation code in the operation code stream;

in response to the current operation code being the logical operation code, reading a Boolean-type operation result from the data stack, and performing a logical operation corresponding to the logical operation code on the Boolean-type operation result to obtain an operation result;

storing the operation result to the data stack;

determining whether all the operation codes in the operation code stream have been read;

in response to all the operation codes in the operation code stream having been read, taking the operation result obtained from a latest logical operation as the Boolean value corresponding to the target record; and in response to not all the operation codes in the operation code stream having been read, performing an operation of reading a current operation code from the operation code stream.

4. The data query method according to claim 3, wherein the reading target arguments corresponding to the current operation code from the argument source comprises:

determining a quantity of arguments and an argument offset address according to the current operation code; and reading the target arguments corresponding to the current operation code from the argument sources based on the quantity of arguments and the argument offset address.

5. The data query method according to claim 3, prior to storing the operation result of the logical operation to the data stack, further comprising:

determining whether the operation result of the logical operation is true;

in response to the operation result of the logical operation being true, performing an operation of storing the operation result of the logical operation to the data stack;

in response to the operation result of the logical operation being false, stopping the screening operation on the target record, and determining that the target record does not conform to the where clause.

6. The data query method according to claim 1, wherein the controlling the CPU to generate an operation code stream of the data structure according to node information comprises:

controlling the CPU to determine, based on the node information, argument information about a function corresponding to each node in the data structure, wherein the argument information comprises the argument source, an argument type, and an argument size; and controlling the CPU to generate the operation code corresponding to each node according to the argument information, and gathering all the operation codes to obtain the operation code stream.

7. The data query method according to claim 6, wherein the controlling the CPU to determine, based on the node information, argument information about a function corresponding to each node in the data structure comprises:

controlling the CPU to execute a first operation, a second operation, and a third operation according to the node information to obtain the argument information about the function corresponding to each node in the data structure, wherein the first operation is determining the argument source of a node according to the node position of the node in the data structure; the second operation is determining a data type of an operation object according to a function name corresponding to the node in the data structure, and determining the argument type of the node according to the data type of the operation object; and the third operation is determining the argument size according to the argument type of the node.

8. A data query system, applied to a heterogeneous acceleration platform comprising a CPU and a parallel processor, wherein the data query system comprises a memory storing a computer program that, when executed, causes the CPU and the parallel processor to implementing operations of:
   determining operators in a database management system, and accomplishing, in the parallel processor, roles of functions corresponding to the operators;
   in response to a SQL query statement being received, converting, by the CPU, a where clause in the SQL query statement into a data structure comprising a binary tree and a linked list, wherein each node in the data structure corresponds to one operator in the where clause;
   controlling the CPU to generate, based on node information, an operation code stream of the data structure, wherein the node information comprises a node position and a corresponding function name of each node in the data structure; and
   performing, by the parallel processor, a screening operation corresponding to the operation code stream on records in the database management system to obtain a query result conforming to the where clause.

9. A heterogeneous accelerated platform, comprising a memory, a CPU, and a parallel processor, wherein a computer program is stored in the memory, and the CPU and the parallel processor implement the steps of the data query method as claimed in claim 1 when calling the computer program in the memory.

10. A non-transient storage medium storing computer-executable instructions that, when loaded and executed by a processor, perform operations of:
   determining operators in a database management system, and accomplishing, in a parallel processor, roles of functions corresponding to the operators;
   in response to a SQL query statement being received, converting, by a CPU, a where clause in the SQL query statement into a data structure comprising a binary tree and a linked list, wherein each node in the data structure corresponds to one operator in the where clause;
   controlling the CPU to generate an operation code stream of the data structure according to node information, wherein the node information comprises a node position and a corresponding function name of each node in the data structure; and
   performing, by the parallel processor, a screening operation corresponding to the operation code stream on records in the database management system to obtain a query result conforming to the where clause.

11. The data query method according to claim 1, wherein the parallel processor is a processing chip with parallel processing capabilities.

12. The data query method according to claim 1, wherein the database management system is one of an open-source client/server relational database management system (PostgreSQL), MySQL, Oracle.

13. The data query method according to claim 1, wherein the operation code stream comprises an execution order of functions corresponding to nodes in the data structure as well as an argument source, an argument type, and an argument size of each function.

14. The data query method according to claim 2, further comprising setting a maximum number of parallel processes of the parallel processor according to arguments of the parallel processor, and the reading a plurality of target records from the database management system comprises reading a corresponding quantity of records based on the maximum number of parallel processes.

15. The data query method according to claim 1, wherein a header of the operation code stream identifies a quantity of operation codes and an offset and size of each operation code in the code stream in a fixed format.

16. The data query method according to claim 15, wherein a header of each operation code identifies a type of the operation code, an ID number of an operation function used by the operation code, a quantity of arguments, and the offset and size of the arguments in the operation code.

17. The data query system according to claim 8, wherein the performing, by the parallel processor, a screening operation corresponding to the operation code stream on records in the database management system to obtain a query result conforming to the where clause comprises:
   reading a plurality of target records from the database management system;
   performing, by the parallel processor, the screening operation corresponding to the operation code stream by using each of the target records as an argument source to obtain a Boolean value corresponding to each of the target records;
   setting a target record whose Boolean value is true as the query result conforming to the where clause;
   determining whether all the records in the database management system have been read; and
   in response to not all the records in the database management system having been read, executing an operation of reading the plurality of target records from the database management system.

18. The data query system according to claim 17, wherein the performing, by the parallel processor, the screening operation corresponding to the operation code stream by using each of the target records as an argument source to obtain a Boolean value corresponding to each of the target records comprises:
   reading a current operation code from the operation code stream;
   determining an operation code type of the current operation code;
   in response to the current operation code being an arithmetic operation code, reading target arguments corresponding to the current operation code from the argument source, and performing an arithmetic operation of a function corresponding to the current operation code on the target arguments to obtain an operation result, wherein the argument source comprises the target record, a preset constant, and a data stack, and the data stack is configured to store the operation result of the arithmetic operation code and a logical operation code in the operation code stream;
   in response to the current operation code being the logical operation code, reading a Boolean-type operation result from the data stack, and performing a logical operation corresponding to the logical operation code on the Boolean-type operation result to obtain an operation result;
   storing the operation result to the data stack;
   determining whether all the operation codes in the operation code stream have been read;

in response to all the operation codes in the operation code stream having been read, taking the operation result obtained from a latest logical operation as the Boolean value corresponding to the target record; and in response to not all the operation codes in the operation code stream having been read, performing an operation of reading a current operation code from the operation code stream.

19. The data query system according to claim 18, wherein the reading target arguments corresponding to the current operation code from the argument source comprises:

determining a quantity of arguments and an argument offset address according to the current operation code; and reading the target arguments corresponding to the current operation code from the argument sources based on the quantity of arguments and the argument offset address.

20. The data query system according to claim 18, prior to storing the operation result of the logical operation to the data stack, the computer program that, when executed, causes the CPU and the parallel processor to implementing operations of:

determining whether the operation result of the logical operation is true;

in response to the operation result of the logical operation being true, performing an operation of storing the operation result of the logical operation to the data stack;

in response to the operation result of the logical operation being false, stopping the screening operation on the target record, and determining that the target record does not conform to the where clause.

\* \* \* \* \*